US012151349B2

(12) United States Patent
Garces et al.

(10) Patent No.: US 12,151,349 B2
(45) **Date of Patent: *Nov. 26, 2024**

(54) DRY-FIRE LOCKOUT AND LAST FASTENER RETENTION MECHANISM FOR POWERED FASTENER DRIVER

(71) Applicant: MILWAUKEE ELECTRIC TOOL CORPORATION, Brookfield, WI (US)

(72) Inventors: Casey D. Garces, Milwaukee, WI (US); Andrew P. Rux, Greendale, WI (US); Andrew R. Wyler, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/846,075

(22) Filed: Jun. 22, 2022

(65) Prior Publication Data

US 2022/0314409 A1 Oct. 6, 2022

Related U.S. Application Data

(63) Continuation of application No. 17/325,939, filed on May 20, 2021, now Pat. No. 11,376,721.

(Continued)

(51) Int. Cl.
*B25C 1/00* (2006.01)
*B25C 1/04* (2006.01)

(52) U.S. Cl.
CPC .............. *B25C 1/008* (2013.01); *B25C 1/003* (2013.01); *B25C 1/047* (2013.01)

(58) Field of Classification Search
CPC .......... B25C 1/047; B25C 1/003; B25C 1/008
See application file for complete search history.

(56) References Cited

U.S. PATENT DOCUMENTS 3,615,049 A 10/1971 Obergfell et al.
4,375,867 A 3/1983 Novak et al.
(Continued)

FOREIGN PATENT DOCUMENTS

EP 1894679 B1 3/2010
EP 2781307 A1 9/2014
(Continued)

OTHER PUBLICATIONS

International Search Report and Written Opinion for Application No. PCT/US2021/033425 dated Sep. 13, 2021 (9 pages).

*Primary Examiner* — Praachi M Pathak
(74) *Attorney, Agent, or Firm* — Michael Best & Friedrich LLP

(57) ABSTRACT

A powered fastener driver includes a housing, a nosepiece having a fastener driver channel from which fasteners are discharged into a workpiece, a driver blade, a workpiece contact element, and a pusher mechanism. The powered fastener driver also includes a dry-fire lockout mechanism having a lockout lever movable between a bypass position and a blocking position and a last fastener holding member configured to engage a fastener within the fastener driver channel. The lockout lever is configured to engage the fastener within the fastener driver channel. The last fastener holding member biases the fastener within the fastener driver channel toward an inner surface of the fastener driver channel to inhibit the fastener from falling out of the fastener driver channel.

20 Claims, 5 Drawing Sheets

Related U.S. Application Data

(60) Provisional application No. 63/028,766, filed on May 22, 2020.

(56) References Cited

U.S. PATENT DOCUMENTS

| | | | | |
|---|---|---|---|---|
| 5,180,091 | A | 1/1993 | Ota | |
| 5,593,079 | A | 1/1997 | Mukoyama et al. | |
| 5,662,257 | A | 9/1997 | Mukoyama et al. | |
| 6,199,739 | B1 | 3/2001 | Mukoyama et al. | |
| 6,267,284 | B1 | 7/2001 | Clark | |
| 6,592,014 | B2 | 7/2003 | Smolinski | |
| 6,908,021 | B1 | 6/2005 | Wang | |
| 6,966,476 | B2 | 11/2005 | Jalbert et al. | |
| 6,966,477 | B1 | 11/2005 | Chien-Kuo et al. | |
| 7,021,511 | B2 | 4/2006 | Popovich et al. | |
| 7,032,794 | B1 | 4/2006 | Hung et al. | |
| 7,059,507 | B2 | 6/2006 | Almeras et al. | |
| 7,086,573 | B1 | 8/2006 | Wen | |
| 7,134,586 | B2 | 11/2006 | McGee et al. | |
| 7,299,959 | B2 | 11/2007 | Ishizawa et al. | |
| 7,303,103 | B2 | 12/2007 | Wang | |
| 7,506,787 | B2 | 3/2009 | Wu et al. | |
| 7,513,403 | B2 | 4/2009 | Fujimoto | |
| 7,600,661 | B2 | 10/2009 | Adachi | |
| 7,980,439 | B2 | 7/2011 | Akiba et al. | |
| 8,011,548 | B2 | 9/2011 | Chang | |
| 8,104,658 | B2 | 1/2012 | Yu | |
| 8,292,143 | B2 | 10/2012 | Lee et al. | |
| 8,336,748 | B2 | 12/2012 | Hlinka et al. | |
| 8,567,654 | B2 | 10/2013 | Wu et al. | |
| 8,746,526 | B2 | 6/2014 | Hlinka et al. | |
| 8,777,079 | B2 | 7/2014 | Po et al. | |
| 9,636,811 | B2 | 5/2017 | Segura | |
| 11,034,005 | B2 * | 6/2021 | Suarez | B25C 1/005 |
| 2009/0039134 | A1 | 2/2009 | Kubo | |
| 2012/0085806 | A1 | 4/2012 | Lee et al. | |
| 2016/0368126 | A1 | 12/2016 | Liu et al. | |
| 2018/0001453 | A1 | 1/2018 | Jaskot et al. | |
| 2019/0039219 | A1 | 2/2019 | Suarez | |
| 2021/0362311 | A1 * | 11/2021 | Garces | B25C 1/008 |

FOREIGN PATENT DOCUMENTS

| | | | |
|---|---|---|---|
| JP | 2009006445 | A | 1/2009 |
| WO | 2013169696 | A2 | 11/2013 |

* cited by examiner

DRY-FIRE LOCKOUT AND LAST FASTENER RETENTION MECHANISM FOR POWERED FASTENER DRIVER

CROSS-REFERENCE TO RELATED APPLICATIONS

This application is a continuation of U.S. patent application Ser. No. 17/325,939 filed on May 20, 2021, now U.S. Pat. No. 11,376,721, which claims priority to U.S. Provisional Patent Application No. 63/028,766 filed on May 22, 2020, the entire contents of both of which are incorporated herein by reference.

FIELD OF THE INVENTION

The present invention relates to powered fastener drivers, and more specifically to lock-out mechanisms for powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation. A lock-out feature may be incorporated that prevents the fastener driver from operating when a predetermined amount of fasteners within the magazine is reached.

SUMMARY OF THE INVENTION

The present invention provides, in one aspect, a powered fastener driver including a housing, a nosepiece coupled to the housing and extending therefrom, the nosepiece having a fastener driver channel from which fasteners are discharged into a workpiece, a driver blade movable within the nosepiece between a ready position and a driven position, a workpiece contact element moveable relative to the nosepiece from a biased, extended position toward a retracted position to enable or initiate a fastener driving operation, and a pusher mechanism for individually transferring fasteners into the fastener driver channel in the nosepiece in which the driver blade is movable. The powered fastener driver also includes a dry-fire lockout mechanism having a lockout lever movable between a bypass position, in which movement of the workpiece contact element from the extended position to the retracted position is not inhibited, and a blocking position, in which movement of the workpiece contact element from the extended position to the retracted position is inhibited. The powered fastener driver further includes a last fastener holding member configured to engage a fastener within the fastener driver channel, the lockout lever is configured to simultaneously engage the same fastener within the fastener driver channel, and the last fastener holder member biases the fastener within the fastener driver channel toward an inner surface of the fastener driver channel to inhibit the fastener from falling out of the fastener driver channel.

The present invention provides, in another aspect, a powered fastener driver including a housing and a nosepiece coupled to the housing and extending therefrom. The nosepiece includes a fastener driver channel from which fasteners are discharged into a workpiece. The powered fastener driver also includes a driver blade movable along a driving axis within the nosepiece between a ready position and a driven position. A workpiece contact element is moveable relative to the nosepiece from a biased, extended position toward a retracted position to enable or initiate a fastener driving operation. A pusher mechanism individually transfers fasteners into the fastener driver channel in the nosepiece in which the driver blade is movable. The powered fastener driver further includes a dry-fire lockout mechanism including a lockout lever movable between a bypass position, in which movement of the workpiece contact element from the extended position to the retracted position is not inhibited, and a blocking position, in which movement of the workpiece contact element from the extended position to the retracted position is inhibited. The powered fastener driver further includes a last fastener holding member. The nosepiece includes a first aperture and a second aperture. The last fastener holding member is at least partially extendable through the first aperture into the fastener driver channel to engage a fastener within the fastener driver channel. The lockout lever is at least partially extendable through the second aperture into the fastener driver channel to engage the fastener within the fastener driver channel. The last fastener holding member biases the fastener within the fastener driver channel toward an inner surface of the fastener driver channel to inhibit the fastener from falling out of the fastener driver channel.

The present invention provides, in yet another aspect, a powered fastener driver including a housing and a nosepiece coupled to the housing and extending therefrom. The nosepiece includes a fastener driver channel from which fasteners are discharged into a workpiece. The powered fastener driver also includes a driver blade movable along a driving axis within the nosepiece between a ready position and a driven position. A workpiece contact element is moveable relative to the nosepiece from a biased, extended position toward a retracted position to enable or initiate a fastener driving operation. A pusher mechanism individually transfers fasteners into the fastener driver channel in the nosepiece in which the driver blade is movable. The powered fastener driver further includes a dry-fire lockout mechanism including a lockout lever movable between a bypass position, in which movement of the workpiece contact element from the extended position to the retracted position is not inhibited, and a blocking position, in which movement of the workpiece contact element from the extended position to the retracted position is inhibited. A first spring is configured to bias the lockout lever toward the blocking position. A last fastener holding member is configured to maintain the lockout lever in the bypass position against the bias of the first spring. A second spring is configured to bias the last fastener holding member toward the fastener driver channel. The nosepiece includes a first aperture and a second aperture. The last fastener holding member is at least partially extendable through the first aperture into the fastener driver channel to engage a fastener within the fastener driver channel. The lockout lever is at least partially extendable through the second aperture into the fastener driver channel to engage the fastener within the fastener driver channel. Each of the first spring and the second spring is configured to impart a force on the fastener within the fastener driver channel.

Additional features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
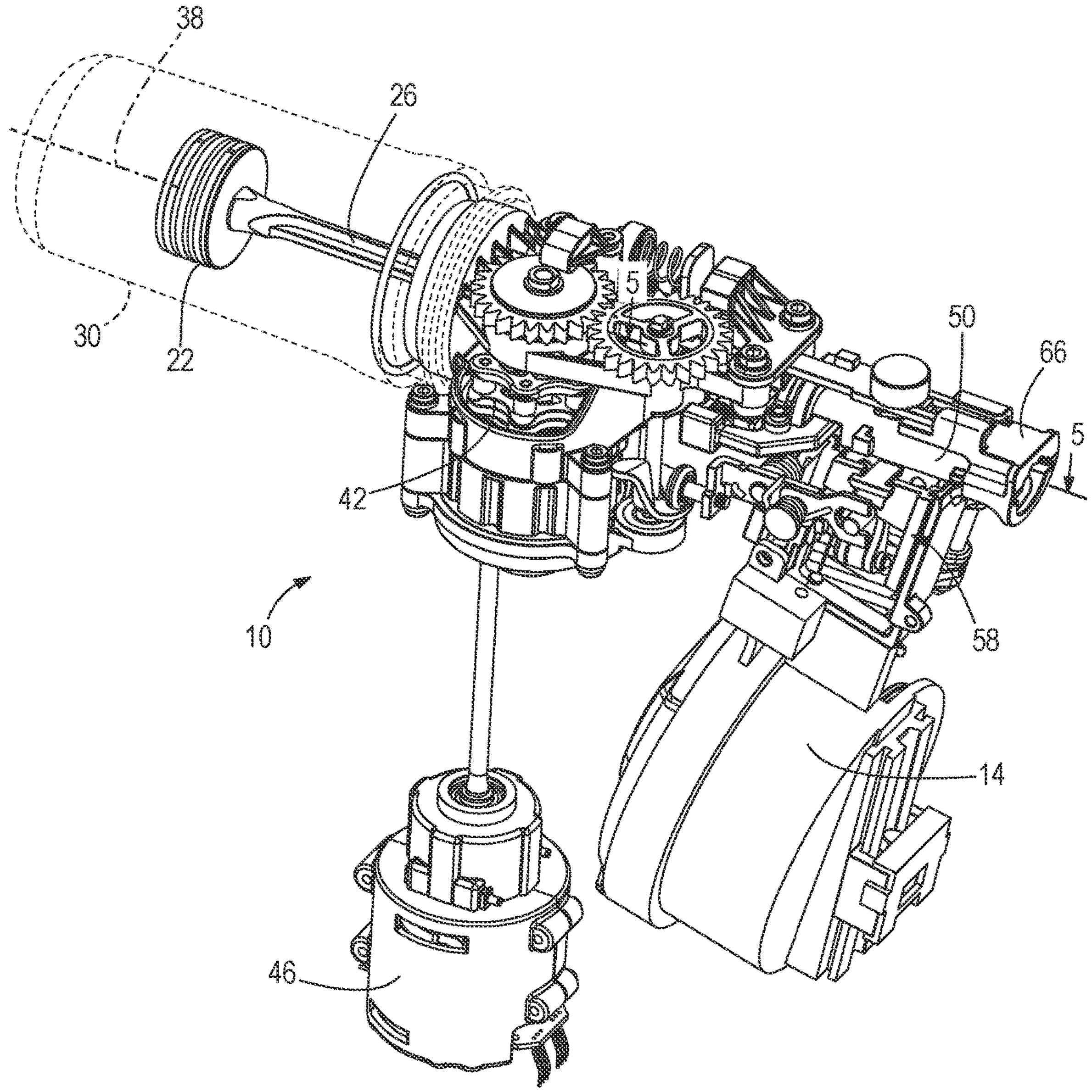
FIG. 1 is a perspective view of a powered fastener driver.

With reference to FIG. 1, a gas spring-powered fastener driver 10 is operable to drive fasteners (e.g., nails) held within a canister magazine 14 into a workpiece. The fastener driver 10 includes a cylinder (not shown) and a moveable piston 22 positioned within the cylinder. The fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder and moveable piston 22 are positioned within the storage chamber cylinder 30.

The cylinder and the driver blade 26 define a driving axis 38, and during a driving cycle the driver blade 26 and piston 22 are moveable between a top dead center (TDC) position and a driven or bottom dead center (BDC) position. The fastener driver 10 further includes a lifting mechanism 42, which is powered by a motor 46, and which is operable to move the driver blade 26 from the BDC position toward the TDC position.

In operation, the lifting mechanism 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Just prior to reaching the TDC position, the motor 46 is deactivated, stopping the piston 22 and the driver blade 26 in a "ready" position where they are held by the lifting mechanism 42 until released by user activation of a trigger (not shown). When the trigger is depressed, the motor 46 is activated, driving the lifting mechanism 42 to lift the piston 22 and driver blade 26 from the ready position toward the TDC position, at which the driver blade 26 is released by the lifting mechanism 42. At this time, the compressed gas above the piston 22 and within the storage chamber 30 drives the piston 22 and the driver blade 26 to the BDC position, thereby driving a fastener into a workpiece. The illustrated fastener driver 10 therefore operates on a gas spring principle utilizing the lifting assembly 42 and the piston 22 to further compress the gas within the cylinder and the storage chamber cylinder 30.

Figure 2:
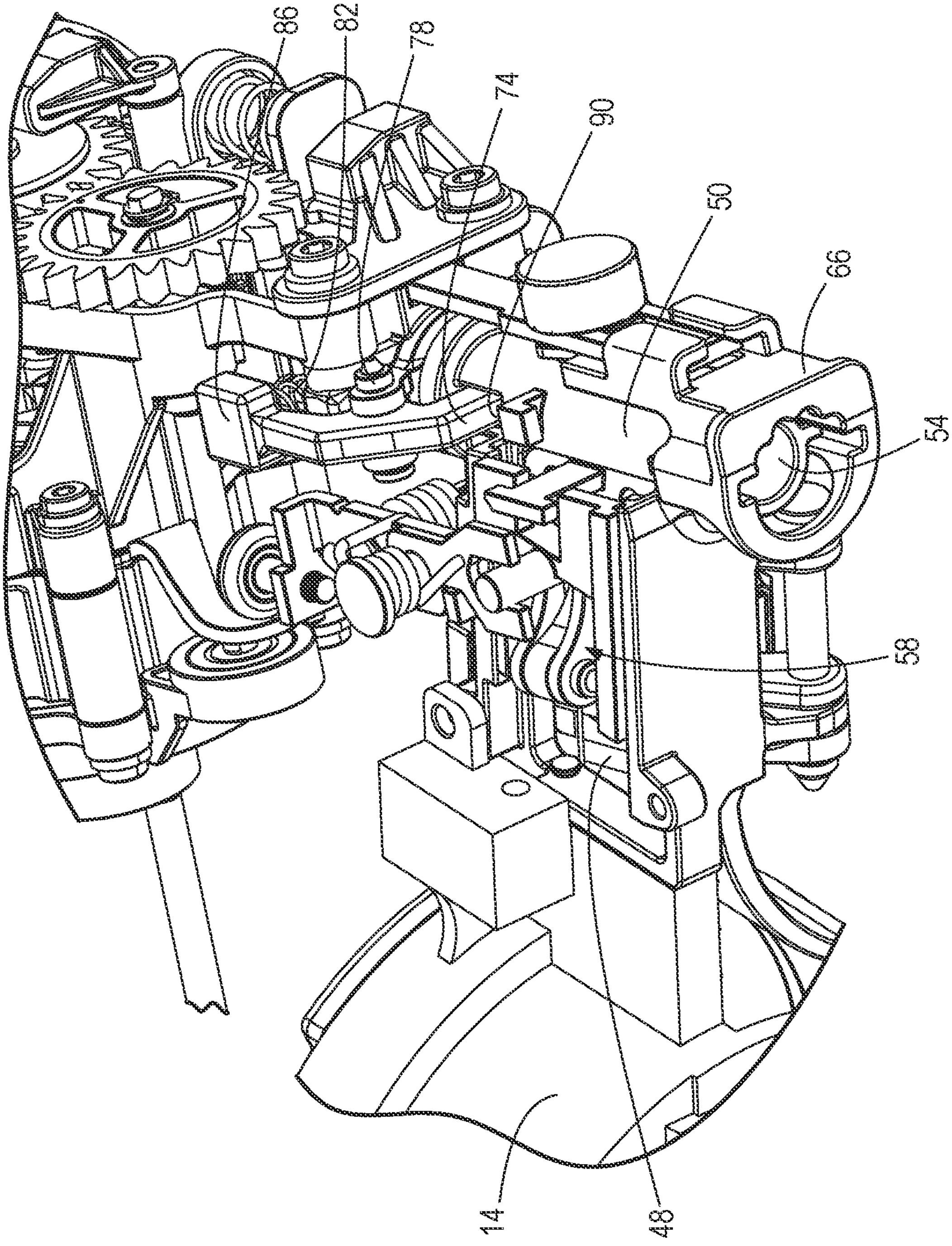
FIG. 2 is a bottom perspective view of the powered fastener driver of FIG. 1.
Figure 3:
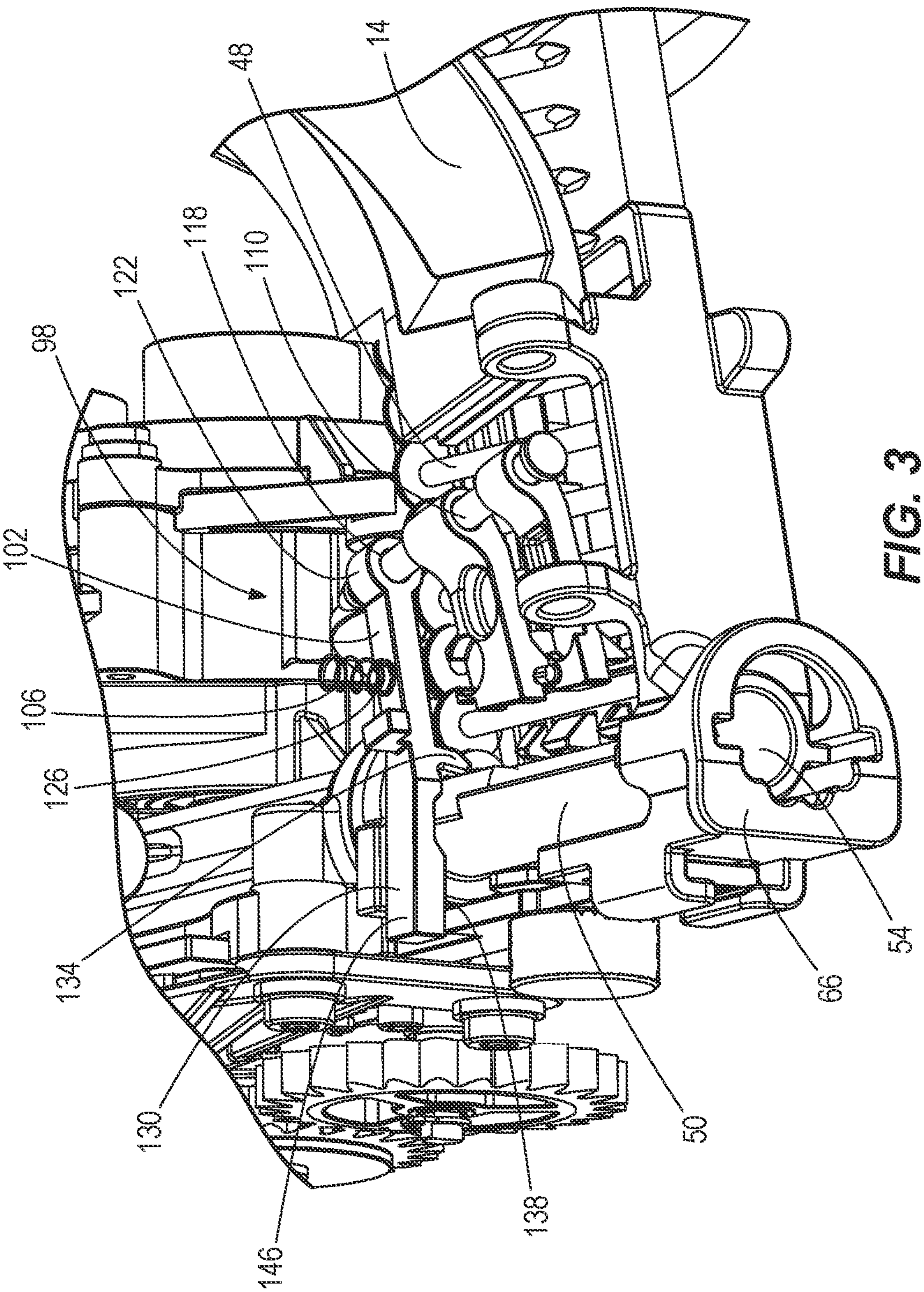
FIG. 3 is a reverse, bottom perspective view of the powered fastener driver of FIG. 1.
Figure 4:
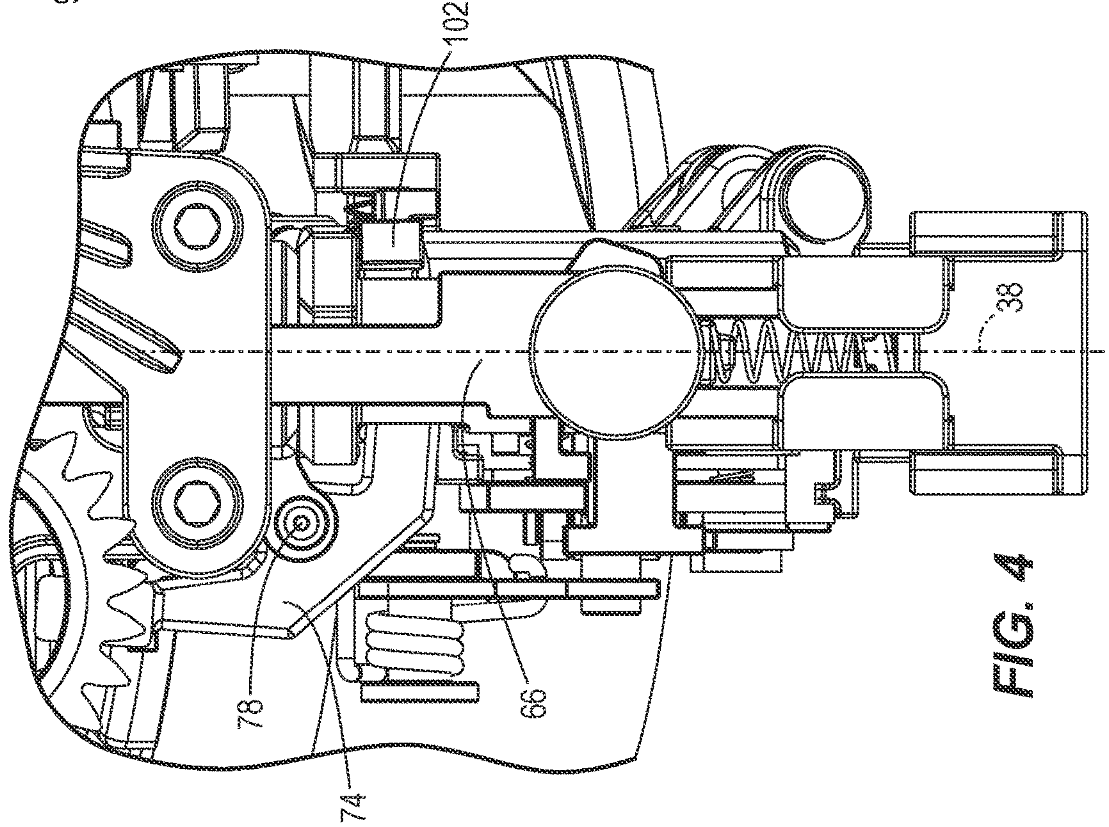
FIG. 4 is a front view of the powered fastener driver of FIG. 1, illustrating a dry-fire lockout mechanism in a bypass position.

The canister magazine 14 includes collated fasteners 48 (FIG. 3) arranged in a coil. The magazine 14 is coupled to a nosepiece 50 in which the fasteners 48 are received (FIGS. 3-4). The fasteners 48 are loaded from the magazine 14 into a driver channel 54 defined within the nosepiece 50 by a pusher mechanism 58 (FIG. 2). The pusher mechanism 58 sequentially feeds fasteners 48 from the magazine 14 into the driver channel 54. After a fastener 48 is inserted into the driver channel 54, the driver blade 26 is movable within the driver channel 54 to discharge the fastener 48 into a workpiece.

With reference to FIGS. 2 and 3, the fastener driver 10 also includes a workpiece contact element 66 that is movable with respect to the nosepiece 50 between a biased, extended position (shown in FIGS. 2 and 3) and a retracted position to enable or initiate a fastener driving operation. A last fastener holding lever 74 (FIG. 2) is positioned on one side of the nosepiece 50 and is pivotably coupled to the nosepiece 50 by a pin 78. A spring 82 (FIG. 5) biases a first end 86 of the holding lever 74 in a counter-clockwise direction from the frame of reference of FIG. 5 such that a second end 88 of the holding lever 74 protrudes into the driver channel 54 via an aperture 90 in the side of the nosepiece 50. The first end 86 of the holding lever 74 includes a recessed portion 92 on a side of the holding lever 74 facing the nosepiece 50 in which the spring 82 is seated. The second end 88 of the holding lever 74 includes an angled face 94 that, when the fastener 48 is within the driver channel 54, is in contact with a head of the fastener 48.

Figure 7:
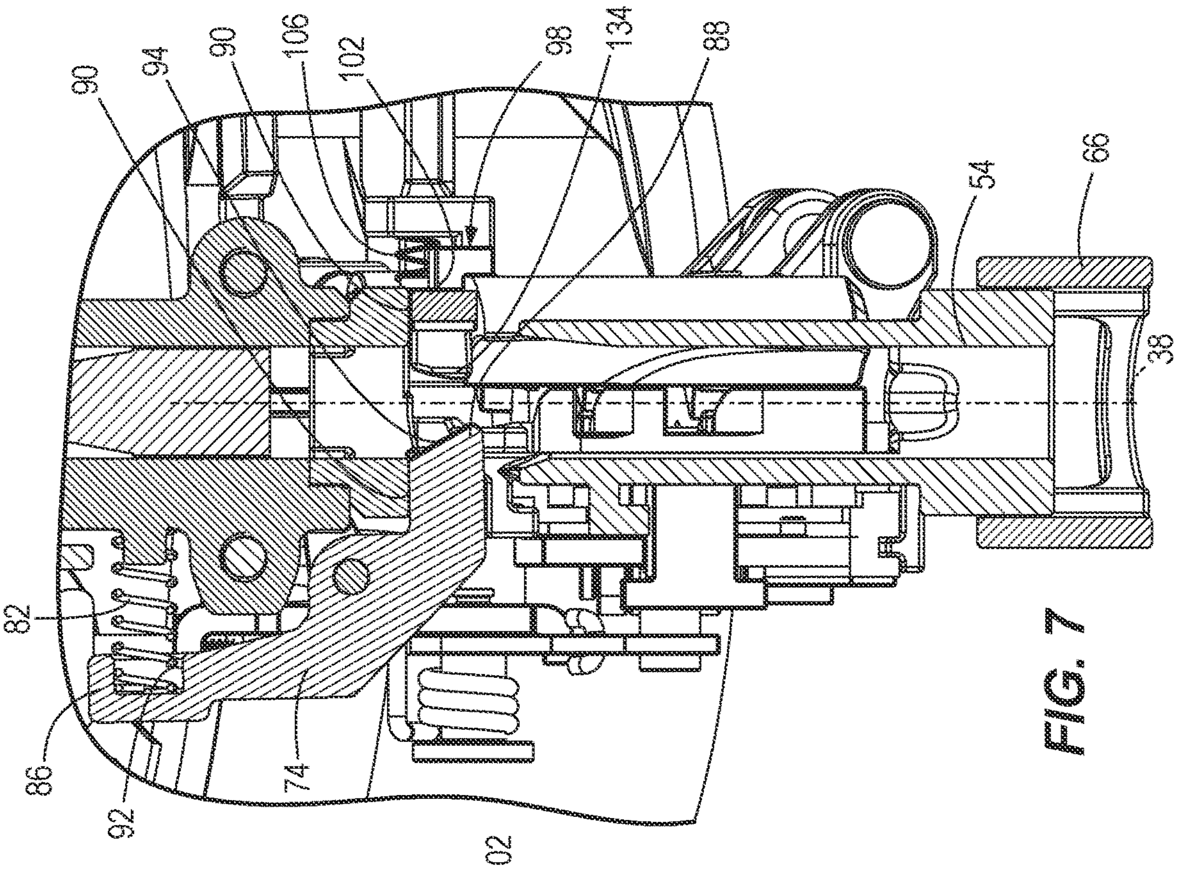
FIG. 7 is a cutaway front view of the powered fastener driver of FIG. 6, illustrating the dry-fire lockout mechanism in the blocking position.

With reference to FIG. 3, the powered fastener driver 10 further includes a dry-fire lockout mechanism 98 that prevents the workpiece contact element 66 from moving to its retracted position when the magazine 14 and nosepiece 50 are emptied of fasteners 48. The dry-fire lockout mechanism 98 includes a lockout lever 102 pivotably coupled to the nosepiece 50 and a spring 106 that biases the lockout lever 102 into the driver channel 54 via the aperture 90 in an opposite side of the nosepiece 50 as the aperture 90 through which the holding lever 74 protrudes (FIG. 7). The lockout lever 102 is carried on, and pivots about, a shaft 110 positioned on a nosepiece door (not shown), which pivots relative to the nosepiece 50 and the magazine 14. The lockout lever 102 is supported upon the shaft 110 through a hole 118 positioned on a first end 122 of the lockout lever 102 (FIG. 3). A protrusion 126 is formed on a first side 130 of the lockout lever 102 facing away from the nosepiece 50, on which the spring 106 is seated, biasing the lockout lever 102 toward the nosepiece 50. A finger 134 is positioned on a second side 138 of the lockout lever 102 that faces the nosepiece 50, the finger 134 being the only component of the lockout lever 102 that protrudes into the aperture 90 and is in contact with the fastener 48 within the driver channel 54. A second end 146 of the lockout lever 102 extends beyond the nosepiece 50, providing a visual indication of the position of the lockout lever 102.

Figure 5:
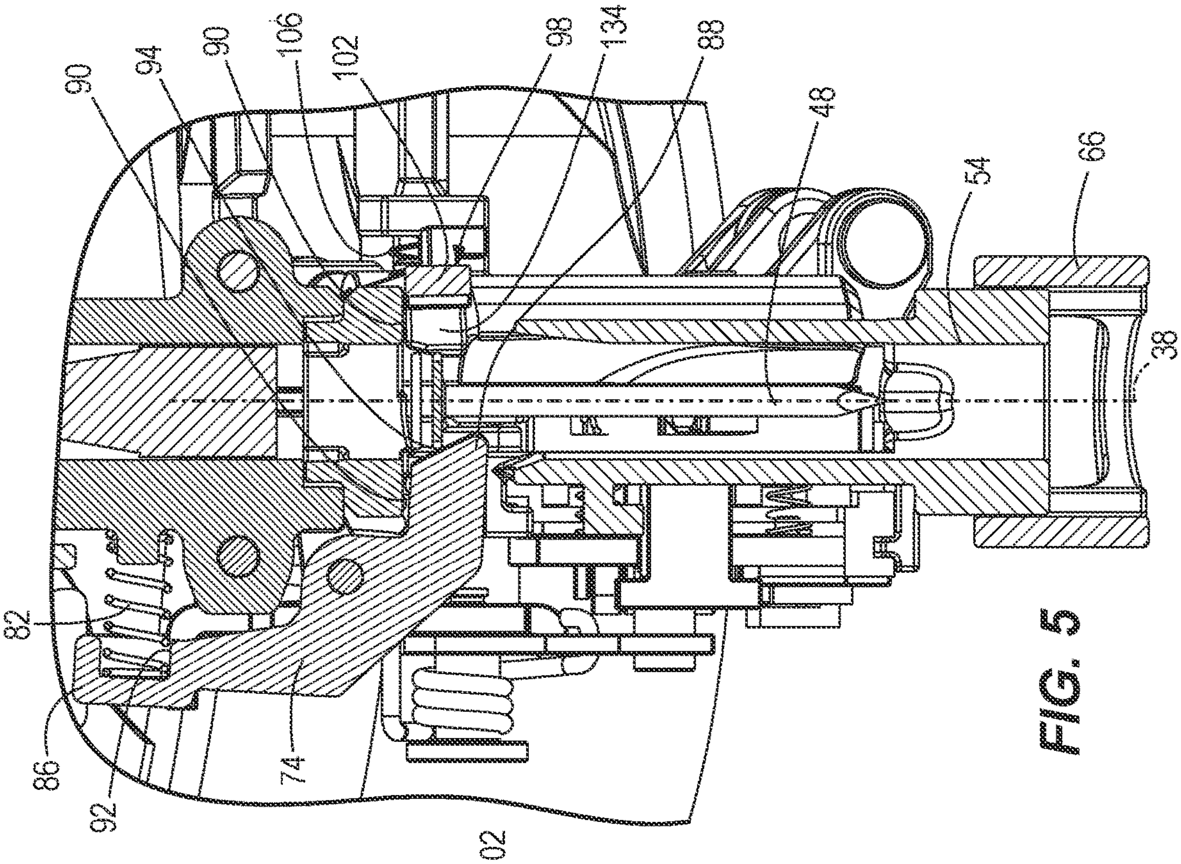
FIG. 5 is a cutaway front view of the powered fastener driver of FIG. 4, illustrating the dry-fire lockout mechanism in the bypass position.

With reference to FIGS. 4 and 5, when the collated strip of fasteners (e.g., nails) is loaded in the magazine 14, a head of the fastener 48 located in the driver channel 54 is engaged on opposite sides by the holding lever 74 and the lockout lever 102 (the finger 134, in particular), respectively. Each of the spring 82 and the spring 106 imparts a force on the fastener 48 within the driver channel 54 (via the holding lever 74 and the lockout lever 102, respectively). The force of each of the springs 82, 106 is selected such that the forces are balanced when the fastener 48 is positioned closer toward the side of the nosepiece 50 adjacent the dry-fire lockout mechanism 98 than the side of the nosepiece 50 adjacent the last fastener holding lever 74. As such, the fastener 48 within the fastener driver channel 54 is biased toward an inner surface of the fastener driver channel 54. The force of the springs 82, 106 is configured to maintain the fastener 48 in this position. With the fastener 48 in this position, the lockout lever 102 is maintained in a bypass position (FIG. 5) in which the lockout lever 102 cannot interfere with movement of the workpiece contact element 66 from its biased, extended position to the retracted position to initiate a fastener driving operation. The holding lever 74 maintains the lockout lever 102 in its bypass position as consecutive fasteners 48 are loaded into the driver channel 54.

When the magazine 14 has been emptied of fasteners 48 and only a single fastener 48 remains in the driver channel 54, the holding lever 74 still biases the last fastener 48 toward the side of the nosepiece 50 in the same manner, maintaining the lockout lever 102 in its bypass position. In this position, the holding lever 74 prevents the last fastener 48 from falling out of the driver channel 54 due to the bias imparted by the holding lever 74. Prior to the last fastener 48 remaining, the fasteners 48 were held within the driver channel 54 by the collation. The bias of the holding lever 74 allows a user to alter the position of the fastener driver 10, without the fastener falling out of the driver channel 54, as it otherwise would without being held within the driver channel 54.

Figure 6:
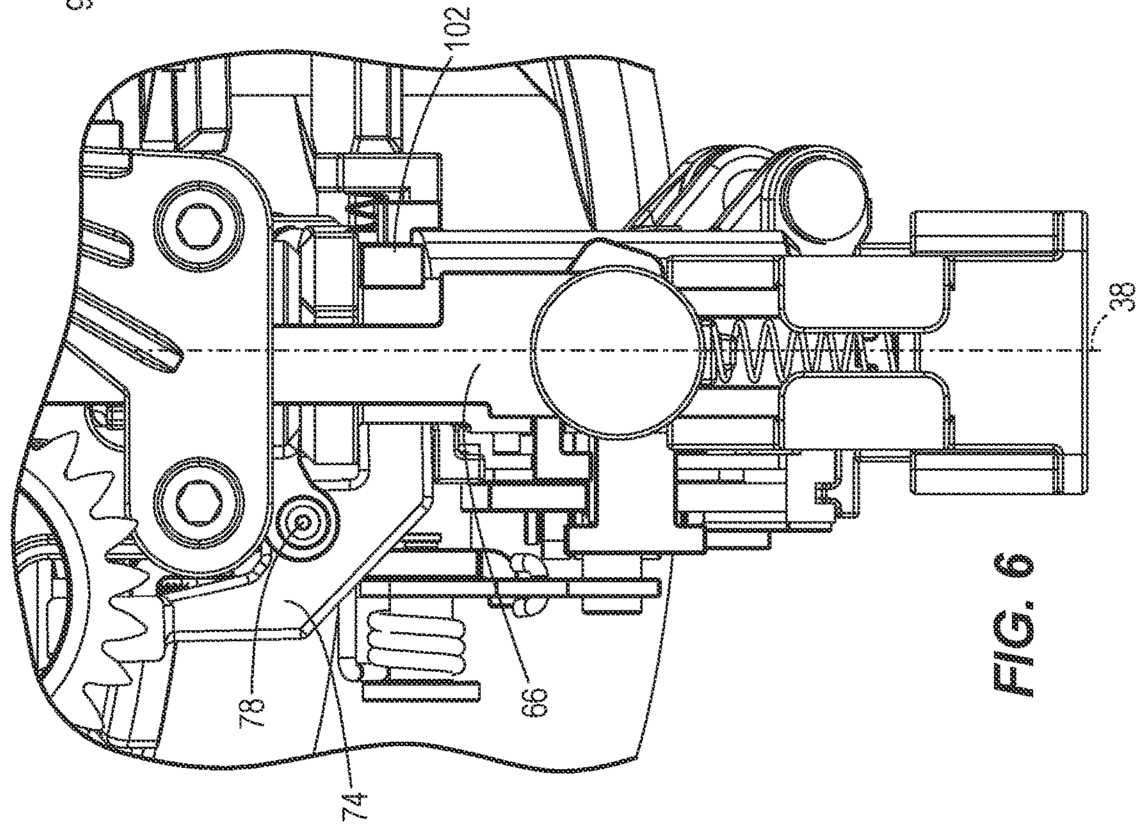
FIG. 6 is a front view of the powered fastener driver of FIG. 1, illustrating the dry-fire lockout mechanism in a blocking position.

With reference to FIGS. 6 and 7, when the last fastener 48 is driven from the driver channel 54, the holding lever 74 cannot maintain the lockout lever 102 in its bypass position due to absence of a fastener 48 in the driver channel 54, permitting the spring 106 to rebound and pivot the lockout lever 102 toward a blocking position in which the finger 134 of the lockout lever 102 overlies the workpiece contact element 66. When the lockout lever 102 is in its blocking position, the workpiece contact element 66 is prevented from moving to its retracted position, due to the finger 134 protruding into the path of travel of the workpiece contact element 66, thereby locking out operation of the fastener driver 10.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:

a housing;

a nosepiece coupled to the housing and extending therefrom, the nosepiece including a fastener driver channel from which fasteners are discharged into a workpiece;

a driver blade movable within the nosepiece between a ready position and a driven position;

a workpiece contact element moveable relative to the nosepiece from a biased, extended position toward a retracted position to enable or initiate a fastener driving operation;

a pusher mechanism for individually transferring collated fasteners into the fastener driver channel in the nosepiece in which the driver blade is movable;

a dry-fire lockout mechanism including a lockout lever movable between a bypass position, in which movement of the workpiece contact element from the extended position to the retracted position is not inhibited, and a blocking position, in which movement of the workpiece contact element from the extended position to the retracted position is inhibited; and a last fastener holding member, wherein the last fastener holding member is configured to engage a fastener within the fastener driver channel, wherein the lockout lever is configured to simultaneously engage the same fastener within the fastener driver channel, and wherein the last fastener holding member biases the fastener within the fastener driver channel toward an inner surface of the fastener driver channel to inhibit the fastener from falling out of the fastener driver channel.

2. The powered fastener driver of claim 1, wherein the lockout lever is maintained in the bypass position by the last fastener holding member via the fastener in the fastener driving channel.

3. The powered fastener driver of claim 1, wherein the driver blade is movable along a driving axis, wherein the driving axis divides the nosepiece into a first side and a second side opposite the first side.

4. The powered fastener driver of claim 3, wherein the nosepiece includes a first aperture positioned on one of the first side or the second side of the nosepiece, and wherein one of the last fastener holding member or the lockout member extends through the first aperture into the fastener driver channel.

5. The powered fastener driver of claim 4, wherein the nosepiece includes a second aperture positioned on the other of the first side or the second side, and wherein the other of the last fastener holding member or the lockout member extends through the second aperture into the fastener driver channel.

6. The powered fastener driver of claim 1, wherein the dry-fire lockout mechanism further includes a first spring configured to bias the lockout lever toward the blocking position, and wherein the last fastener holding member is configured to maintain the lockout lever in the bypass position against the bias of the first spring.

7. The powered fastener driver of claim 6, further comprising a second spring configured to bias the last fastener holding member toward the first side of the fastener within the fastener driver channel.

8. The powered fastener driver of claim 7, wherein each of the first spring and the second spring is configured to impart a force on the fastener within the fastener driver channel, and wherein the force of each the first spring and the second spring is selected such that the forces of the first and second springs are balanced when the fastener is positioned closer toward the inner surface of the fastener driver channel adjacent the lockout lever than an inner surface of the fastener driver channel adjacent the last fastener holding member.

9. The powered fastener driver of claim 1, further comprising a spring configured to bias the last fastener holding member toward the first side of the fastener within the fastener driver channel.

10. The powered fastener driver of claim 9, wherein the last fastener holding member extends between a first end and a second end, wherein the spring is configured to exert a biasing force on the first end, and wherein the second end is movable toward the fastener within the fastener driver channel.

11. The powered fastener driver of claim 1, wherein the lockout lever is movable from the bypass position toward the blocking position when there are no fasteners within the fastener driver channel.

12. The powered fastener driver of claim 1, wherein the last fastener holding member includes an end configured to engage the first side of the fastener within the fastener driver channel, and wherein the end includes an angled face configured to engage a head of the fastener within the fastener driver channel.

13. The powered fastener driver of claim 1, wherein the lockout member includes an end extending beyond the nosepiece to provide a visual indication to a user that the lockout member is in the bypass position or the blocking position.

14. The powered fastener driver of claim 1, wherein the nosepiece includes an aperture, wherein the lockout member includes a finger extending through the aperture into the fastener driver channel, and wherein the finger is configured to engage the opposite, second side of the fastener within the fastener driver channel.

15. A powered fastener driver comprising:

a housing;

a nosepiece coupled to the housing and extending therefrom, the nosepiece including a fastener driver channel from which fasteners are discharged into a workpiece;

a driver blade movable along a driving axis within the nosepiece between a ready position and a driven position;

a workpiece contact element moveable relative to the nosepiece from a biased, extended position toward a retracted position to enable or initiate a fastener driving operation;

a pusher mechanism for individually transferring fasteners into the fastener driver channel in the nosepiece in which the driver blade is movable;

a dry-fire lockout mechanism including a lockout lever movable between a bypass position, in which movement of the workpiece contact element from the extended position to the retracted position is not inhibited, and a blocking position, in which movement of the workpiece contact element from the extended position to the retracted position is inhibited; and a last fastener holding member;

wherein the nosepiece includes a first aperture and a second aperture, wherein the last fastener holding member is at least partially extendable through the first aperture into the fastener driver channel to engage a fastener within the fastener driver channel, wherein the lockout lever is at least partially extendable through the second aperture into the fastener driver channel to engage the fastener within the fastener driver channel, and wherein the last fastener holding member biases the fastener within the fastener driver channel toward an inner surface of the fastener driver channel to inhibit the fastener from falling out of the fastener driver channel.

16. The powered fastener driver of claim 15, wherein the lockout lever is maintained in the bypass position by the last fastener holding member via the fastener in the fastener driving channel.

17. The powered fastener driver of claim 15, wherein the dry-fire lockout mechanism further includes a spring configured to bias the lockout lever toward the blocking position, and wherein the last fastener holding member is configured to maintain the lockout lever in the bypass position against the bias of the spring.

18. The powered fastener driver of claim 15, further comprising a spring configured to bias the last fastener holding member toward the first side of the fastener within the fastener driver channel.

19. The powered fastener driver of claim 15, wherein the lockout lever is movable toward the blocking position when there are no fasteners within the fastener driver channel.

20. A powered fastener driver comprising:

a housing;

a nosepiece coupled to the housing and extending therefrom, the nosepiece including a fastener driver channel from which fasteners are discharged into a workpiece;

a driver blade movable along a driving axis within the nosepiece between a ready position and a driven position;

a workpiece contact element moveable relative to the nosepiece from a biased, extended position toward a retracted position to enable or initiate a fastener driving operation;

a pusher mechanism for individually transferring fasteners into the fastener driver channel in the nosepiece in which the driver blade is movable;

a dry-fire lockout mechanism including a lockout lever movable between a bypass position, in which movement of the workpiece contact element from the extended position to the retracted position is not inhibited, and a blocking position, in which movement of the workpiece contact element from the extended position to the retracted position is inhibited, and wherein a first spring is configured to bias the lockout lever toward the blocking position;

a last fastener holding member, the last fastener holding member configured to maintain the lockout lever in the bypass position against the bias of the first spring; and a second spring configured to bias the last fastener holding member toward the fastener driver channel, wherein the nosepiece includes a first aperture and a second aperture, wherein the last fastener holding member is at least partially extendable through the first aperture into the fastener driver channel to engage a fastener within the fastener driver channel, wherein the lockout lever is at least partially extendable through the second aperture into the fastener driver channel to engage the fastener within the fastener driver channel, wherein each of the first spring and the second spring is configured to impart a force on the fastener within the fastener driver channel.

* * * * *